July 16, 1935.　　　E. F. RALL ET AL　　　2,008,470
GRAIN LIFTING REEL
Filed June 15, 1934　　3 Sheets-Sheet 1

Inventors
E. F. Rall
A. Kenitzer
By Clarence A. O'Brien
Attorney

July 16, 1935. E. F. RALL ET AL 2,008,470
GRAIN LIFTING REEL
Filed June 15, 1934  3 Sheets-Sheet 3

Inventors
E. F. Rall
A. Kenitzer
By Clarence A. O'Brien
Attorney

Patented July 16, 1935

2,008,470

UNITED STATES PATENT OFFICE 2,008,470

GRAIN LIFTING REEL

Eugene F. Rall and Albert Kenitzer, Hoxie, Kans.

Application June 15, 1934, Serial No. 730,827

8 Claims. (Cl. 56—219)

This invention relates to that class of inventions comprehending different types and kinds of rakes, reels and the like such as used in connection with combined harvesting and threshing machines, and it has more specific reference to a structurally refined and improved reel operable in advance of the reciprocatory sickle bar employed on present day harvesting machines.

Our primary aim is to generally improve upon the specific construction and arrangement of parts employed in the construction of a new type reel distinguishable as a novel contribution to the art in that it is adjustable to coincide with grains of different height.

Otherwise stated, we have evolved and produced an efficient and dependable reel structure whose grain lifting end is adjustable in a limited arc capable of effectually fulfilling the requirements of a structure of this type.

Other features and advantages of the invention will become more readily apparent from the following description and drawings.

Figure 1:
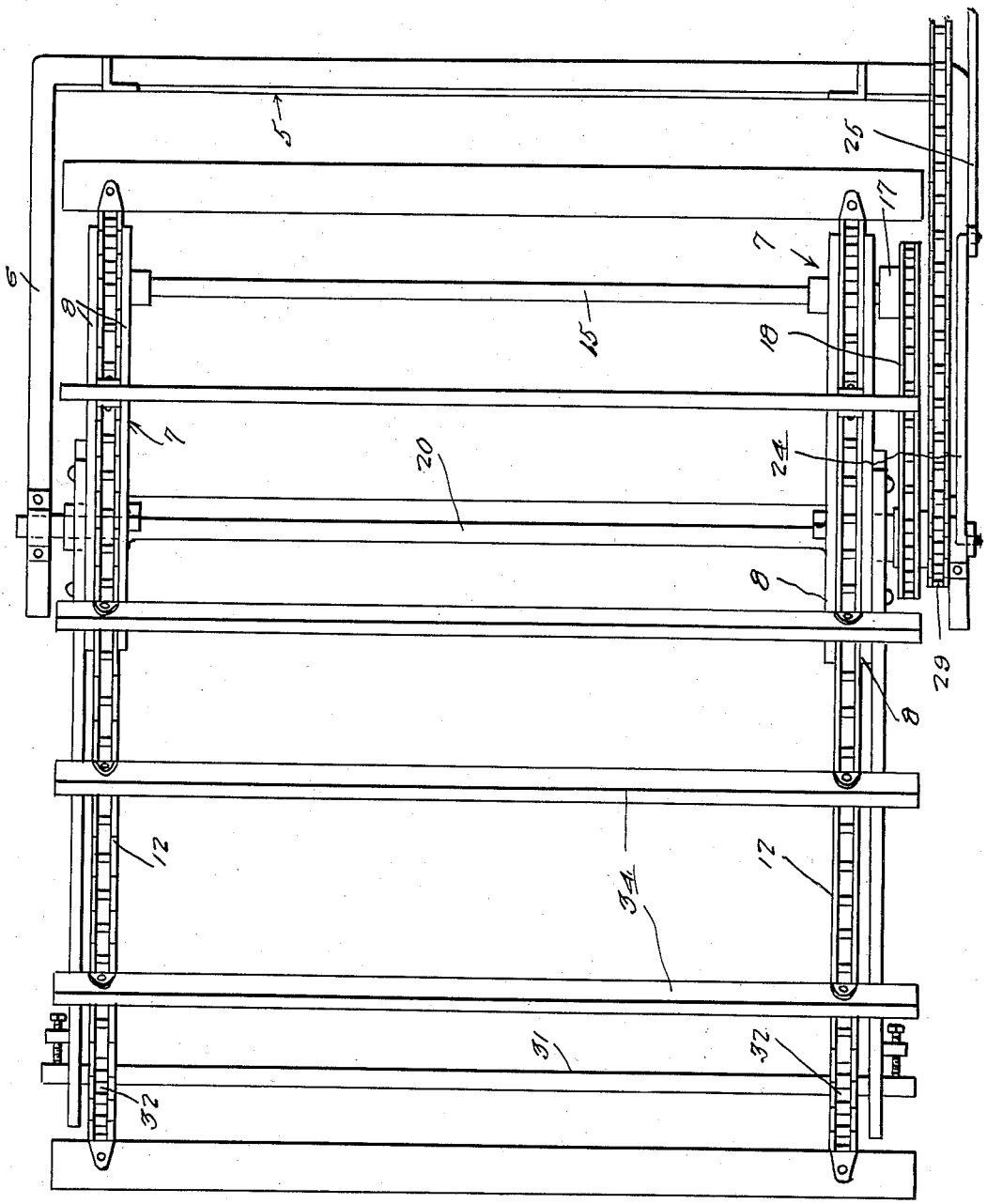
Figure 1 is a top plan view of a structure developed in accordance with the principles of the present invention.
Figure 2:
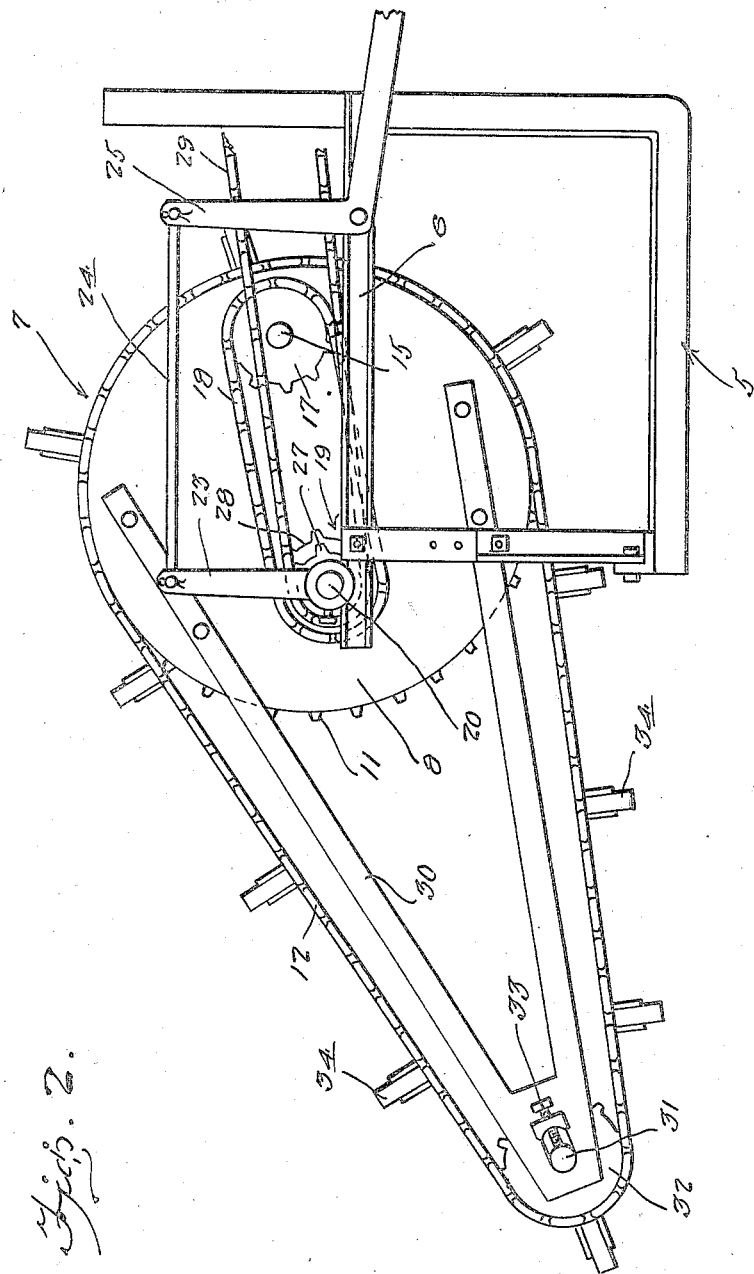
Figure 2 is a side elevational view thereof.

Referring now to the drawings and particularly to Figure 2 it will be observed that the frame structure is distinguished by the numeral 5 and is of any appropriate construction and includes horizontal supporting rails 6.

The reel comprises a pair of duplicate casing heads 7 and each head embodies a pair of spaced parallel disk-like plates 8 with a floating ring gear 9 (see Figure 3) mounted therebetween. The gear teeth of said ring gear 9 are distinguished by the numerals 10, while the numerals 11 designate sprocket teeth for driving the endless sprocket chain 12. Mounted on stub shafts 13 between the plates are idling pinions 14 in mesh with the teeth 10. Mounted on a driven shaft 15 is the driving pinion 16. Incidently, this shaft 15 extends through appropriate bearings formed in the plates of both of the heads. Moreover, as shown in Figure 2, the shaft is provided at one end with a relatively small sprocket wheel 17 actuated through the intermediacy of a sprocket chain 18 driven by the duplex sprocket unit 19 shown in Figure 4. In connection with Figure 4 we wish to mention the rock shaft 20 which extends through the two heads 7 and to which the plates 8 are secured through the medium of collars 21 and set screws 22. Attached to the protruding end of the shaft 20 is a rocker arm 23 to which a link 24 is connected. The link 24 is in turn connected with an operating bell crank 25 pivotally mounted on one of the rails 6. The shaft 20 is mounted for oscillation in appropriate bearings 26 as detailed in Figure 4. In connection with this figure we call attention to the fact that the unit 19 includes companion sprocket wheels 27 and 28. The chain 18 is trained over the sprocket 28 and a power supply chain 29 is operatively connected with the sprocket 27. It will be noted that this sprocket unit 19 is freely rotatable on the extended end of the oscillatory adjusting shaft 20. Obviously, by supporting this shaft 20 in bearings on the frame and attaching it to the casing head 7 at points eccentrically of said head, it is obvious that this allows the head to be adjusted around a fixed pivot.

We next call attention to the numeral 30 in Figure 2 which designates one of the V-shaped yokes whose apex portion is formed with a bearing to accommodate a frontal driven shaft 31. This shaft carries sprocket wheels 32 over which the adjacent portions of the sprocket chains 12 are trained as shown in the drawings. Suitable chain tightening means is provided as indicated at 33. The numerals 34 designate the slats which are transversely arranged in spaced parallelism and attached at longitudinally spaced points to the chains 12 for the purpose of getting under and lifting fallen grain at a point in advance of the sickle bar (not shown).

Figure 3:
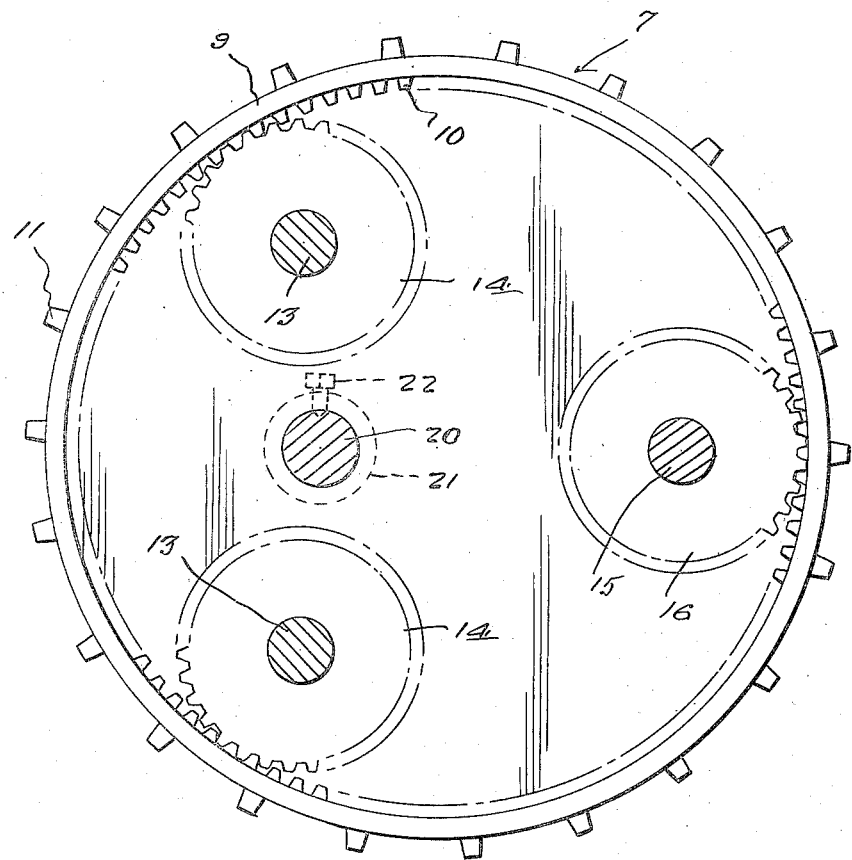
Figure 3 is a view in section and elevation through one of the casing heads.

Novelty is predicated upon the provision of an appropriate supporting and attaching frame provided with bearings to accommodate the oscillatory rock shaft 20 to which the duplicate casing heads 7 are attached wherein said shaft is adjusted through the intermediacy of the rocker arm 23, link 24 and the complemental bell crank 25. This obviously permits the heads 7 to be bodily turned in an orbital manner. Inasmuch as the arms of the yoke 30 are rigidly attached to the heads it is evident that this permits the reel as a single unit to be adjusted. In other words it permits the grain lifting end of the conveyor (sprocket chains 12 and slats 34) to be raised and lowered to promote proper regulation for effective work. Novelty is also predicated upon the utilization of the self-contained casing heads 7 composed of the spaced parallel disks or plates 8 with the floating ring therebetween wherein said ring gear is fashioned to function as a sprocket wheel for driving the chain 12;

together with the assembly of pinions 14 and 16 operating in the manner illustrated in Figure 3. This is a simplified arrangement which does not interfere with the bodily adjustment of the head and at the same time insures a positive drive for the chains 12.

Figure 4:
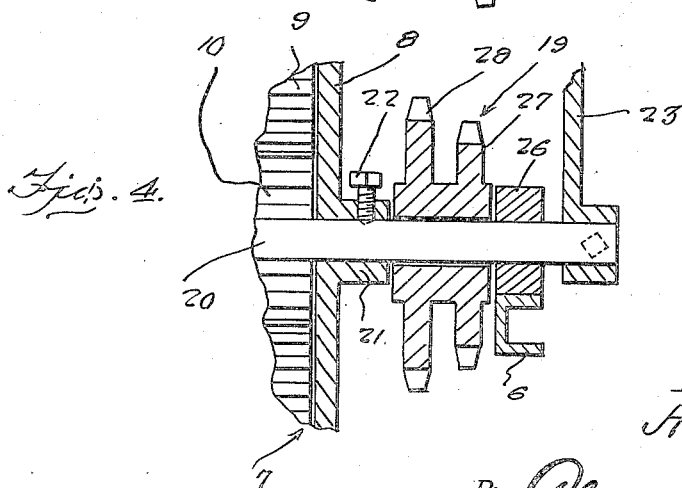
Figure 4 is a detail view.

Further novelty is predicated upon the means for transmitting power from the main propulsion chain 29 to the secondary power take-off chain 18 by way of the duplex sprocket unit 19 freely rotatable on the shaft end 20 as shown in Figure 4 in order to provide a unique arrangement for rotating the shaft 15 and the pinion 16 fixed thereon. It is apparently unimportant to mention that the shaft 15 is eccentrically mounted as is obvious from an observation of Figure 2.

Functionally, this reel acts like other rakes and reels used for lifting fallen grain. Structurally, however, it is readily distinguishable and constitutes an appreciable contribution to the art and the trade to which it relates. This is particularly so insofar as it relates to the novel construction comprising the casing heads 7 with their self-contained driving means having the spaced parallel yokes 30 attached thereto wherein said yokes carry the sprockets 32 for operating the chains 12.

It is thought that persons skilled in the art to which the invention relates will be able to obtain a clear understanding of the invention after considering the description in connection with the drawings. Therefore, a more lengthy description is regarded as unnecessary.

Minor changes in shape, size, and rearrangement of details coming within the field of invention claimed may be resorted to in actual practice, if desired.

We claim:

1. In a structure of the class described, a relatively stationary frame provided with bearings, an oscillatory rocker shaft mounted for oscillation in said bearings, manually regulated adjusting means for said rocker shaft, a grain lifting reel including endless conveyor means and self-contained operating means, said reel being attached operatively to said shaft for adjustment therewith, and power supply means having power transmitting connection with said operating means.

2. A structure of the class described comprising a relatively stationary supporting frame provided with bearings, a rocker shaft mounted for oscillation in said bearings, adjusting means for said rocker shaft, a grain lifting reel, said reel embodying a pair of spaced casing heads eccentrically attached to said rocker shaft, each casing head including a sprocket-ring and self-contained operating means therefor, side members rigidly attached to and projecting forwardly and downwardly from the casing heads, a shaft mounted for rotation in the frontal end portions of said side members and provided with sprocket wheels, sprocket chains trained over said sprocket wheels and sprocket-ring, and slats extending transversely across and connected to said sprocket chains at longitudinally spaced points.

3. A structure of the class described comprising a relatively stationary frame including horizontal rails provided with bearings, a rocker shaft mounted for oscillation in said bearings, a rocker arm attached to the outer end of the shaft at one end thereof, a bell crank mounted on one of said rails, a link connection between the bell crank and rocker arm, a reel structure operatively and eccentrically attached to said rocker shaft for adjustment therewith, said reel structure including duplicate casing heads with self-contained operating means, and an operating element supported on said rocker shaft and operatively connected with said means.

4. A structure of the class described comprising a relatively stationary supporting frame, a rocker shaft mounted in bearings carried by said frame, regulating means for said rocker shaft, a grain lifting reel, said reel comprising a pair of duplicate casing heads, each casing head embodying spaced parallel disks or plates eccentrically attached to the complemental end portions of said rocker shaft, a ring gear mounted for rotation between said plates, said ring gear being provided with external sprocket teeth, a plurality of pinions mounted for simultaneous rotation between said plates, two of said pinions being idlers, and the remaining pinion a driving element, said last named pinion being supported on a rotary driven shaft having a sprocket reel attached thereto.

5. A structure of the class described comprising a relatively stationary supporting frame, a rocker shaft mounted in bearings carried by said frame, regulating means for said rocker shaft, a grain lifting reel, said reel comprising a pair of duplicate casing heads, each casing head embodying spaced parallel disks or plates eccentrically attached to the complemental end portion of said rocker shaft, a ring gear mounted for rotation between said plates, said ring gear being provided with external sprocket teeth, a plurality of pinions mounted for simultaneous rotation between said plates, two of said pinions being idlers, and the remaining pinion a driving element, said last named pinion being supported on a rotary driven shaft having a sprocket reel attached thereto, said rocker shaft being extended at one end, a duplex sprocket unit mounted for free rotation on said extended end, a sprocket chain trained over one of the sprocket portions thereof, and the last named sprocket wheel, and a power transmission sprocket chain trained over the remaining sprocket portion of said unit.

6. A structure of the class described comprising a grain lifting reel including a pair of duplicate casing heads, each casing head embodying spaced parallel disk-like plates, a plurality of pinions mounted for rotation between said plates, a ring gear mounted between said plates and in mesh with the teeth of said pinions, said ring gear being provided with sprocket teeth protruding outwardly beyond the marginal portions of said plates, a pair of V-shaped yokes, the free end portions of the arms thereof being fixedly attached to the outer plates of said heads, the apex portions of said yokes being formed with bearings, a shaft mounted for rotation in said bearings, sprocket wheels carried by said shaft, sprocket chains trained over said sprocket wheels and the sprocket teeth of the aforesaid ring gears, and a plurality of grain lifting slats extending transversely across and attached to said sprocket chains.

7. In a structure of the class described, a relatively fixed supporting structure having bearings, a horizontally disposed rocker shaft mounted for oscillation in said bearings, manually regulated adjusting means for controlling said rocker shaft, an endless grain lifting reel occupying a normally inclined position with respect to said supporting structure, the inner end portion of said reel embodying self-contained motion transmitting means and being connected with said shaft in such a manner as to raise and lower the outer end portion of the reel when said shaft is oscillated through the instrumentality of said adjusting means.

8. In a structural assemblage of the class described, a grain lifting reel comprising a pair of oppositely disposed duplicate casing heads, each casing head including a peripheral sprocket tooth equipped member, internal means in the casing for revolving said member, spaced parallel side frames connected at corresponding ends with said casing head, said side frames being provided at their opposite ends with a rotatably mounted shaft having sprocket wheels, sprocket chains trained over said sprocket wheels and aforesaid sprocket teeth, and grain lifting slats connected with said sprocket chain.

ALBERT KENITZER.
EUGENE F. RALL.